US007822836B1

(12) United States Patent
Saparoff

(10) Patent No.: US 7,822,836 B1
(45) Date of Patent: Oct. 26, 2010

(54) SYSTEM AND METHOD FOR AUTOMATED DISCOVERY OF VENDOR PROFILES IN MANAGEMENT INFORMATION BASES (MIBS)

(75) Inventor: Nicholas Saparoff, Franklin, MA (US)

(73) Assignee: ByteSphere Technologies, LLC, Franklin, MA (US)

( * ) Notice: Subject to any disclaimer, the term of this patent is extended or adjusted under 35 U.S.C. 154(b) by 1076 days.

(21) Appl. No.: 10/907,941

(22) Filed: Apr. 21, 2005

Related U.S. Application Data

(63) Continuation-in-part of application No. 10/969,359, filed on Oct. 19, 2004.

(60) Provisional application No. 60/512,949, filed on Oct. 20, 2003.

(51) Int. Cl.
*G06F 15/173* (2006.01)
(52) U.S. Cl. ........................................ 709/223; 709/224
(58) Field of Classification Search ................. 709/223, 709/224
See application file for complete search history.

(56) References Cited

U.S. PATENT DOCUMENTS

| 5,473,608 | A | * | 12/1995 | Gagne et al. | 370/401 |
| 5,706,440 | A | * | 1/1998 | Compliment et al. | 709/224 |
| 6,029,197 | A | * | 2/2000 | Erimli et al. | 709/223 |
| 6,272,537 | B1 | * | 8/2001 | Kekic et al. | 709/223 |
| 7,143,156 | B2 | * | 11/2006 | Menzies et al. | 709/223 |

* cited by examiner

*Primary Examiner*—Benjamin R Bruckart
*Assistant Examiner*—Shripal K Khajuria
(74) *Attorney, Agent, or Firm*—Lahive & Cockfield, LLP; John S. Curran

(57) ABSTRACT

A generic mechanism enabling the programmatic identification of MIBs needed for control of an SNMP agent for a network device is disclosed. The present invention provides for the automatic retrieval of the identified MIBs and their loading onto a network management station (NMS) without user intervention. Additionally, previously known MIBs are programmatically examined to determine whether they require updating. Any required updates may be performed automatically with the updated MIBs being loaded onto the NMS.

13 Claims, 6 Drawing Sheets

SYSTEM AND METHOD FOR AUTOMATED DISCOVERY OF VENDOR PROFILES IN MANAGEMENT INFORMATION BASES (MIBS)

CROSS REFERENCE TO RELATED APPLICATIONS

The illustrative embodiment of the present invention is a continuation-in-part of a pending U.S. application entitled "System and Method for Automated Discovery and Procurement of Management Information Bases (MIBs)", application Ser. No. 10/969,359, filed Oct. 19, 2004 which in turn claims priority to a U.S. provisional application entitled "Method and Apparatus for automatic discovery and procurement of needed MIBs for management of an SNMP agent by a network management station (NMS)", U.S. Application No. 60/512,949, filed Oct. 20, 2003.

FIELD OF THE INVENTION

The illustrative embodiment of the present invention relates generally to management of network devices, and more particularly to the automatic determination, procurement and loading of Management Information Bases (MIBs) on a network management station that are needed to manage an SNMP agent for a network device.

BACKGROUND OF THE INVENTION

The Simple Network Management Protocol (SNMP) is a protocol enabling the control and management of devices communicating over a network. The network devices may be controlled by SNMP commands sent from a network management station (NMS) to an SNMP agent for the network device. One or more Management Information Bases (MIBs) loaded on the network management station are used to determine which commands to send to the SNMP agent. A MIB specifies management information and events for a device in a defined format and includes both prose descriptions and computer-readable descriptions. The SNMP agent accepts properly formatted communications from the network management station and allows the remote configuration of the device from the network management station.

There are several reasons why a network administrator may want to contact an SNMP agent in a live network. For example, one reason may be to retrieve diagnostic values on an SNMP agent or device implementing an SNMP agent. Using a sufficiently knowledgeable NMS (one that has loaded both standard MIBs and very often vendor proprietary MIBs), the SNMP agent can be queried by the NMS by sending an SNMP packet which includes specific Object Identifiers (OIDs). These OIDs represent objects that the network administrator is interested in, such as CPU Utilization, Bytes (coming into or out of a network interface on a device), Memory Utilization, and objects holding other device information. Another reason would be to modify values on an SNMP agent to configure it to support a new mode of operation or cause the device to behave in a certain way.

Unfortunately, the MIBs (one or more) needed to control the SNMP agent for the device communicating over the network, and thus the device, vary depending upon the vendor of the device. Conventional methods of determining, retrieving and updating MIBs needed to control an SNMP agent for a network device all suffer from various drawbacks. One conventional method of determining the MIBs needed to control the SNMP agent involves the querying of a vendor specific region of a separate MIB for the SNMP agent. As the SNMP agent hosted MIB is proprietary, this requires a different procedure for each vendor. Another method of determining which MIBs are necessary to communicate with the SNMP agent is to query a table defined in the SNMPv2-MIB specification called sysORTable and implemented on the SNMP agent MIB. The sysORTable is defined as a table listing the capabilities of the local SNMP application acting as a command responder with respect to various MIB modules. However, most SNMP agents do not include the table despite its definition in the SNMPv2-MIB specification. Similarly, an additional way that an NMS can determine the needed MIB modules is to query the SNMP agent and to extract the MIB information from the SNMP agent in various formats, and to reassemble the information locally on the NMS. The problem with this solution is that the numbers of vendors implementing the type of MIB from which the needed information can be extracted are very few. In addition, the MIB access is generally proprietary in nature. An alternative method of determining needed MIBs includes walking an entire SNMP agent's MIB (i.e. using SNMP GetNext requests), to determine the MIB capabilities. However, this method of walking the MIB is slow, network intensive, and prone to be incomplete, as the NMS requires prior knowledge of all needed MIBs in order to correctly cross-reference the SNMP responses with the known Object Identifiers (OIDs) in the NMS.

An SNMP Agent can have several vendors represented in the enterprise area of the MIB. This can be due to partnerships between vendors, a vendor buyout, an OEM deal, etc. One difficult problem has always been to find out which vendors are actually represented in the enterprise area of an SNMP Agent's MIB. Conventional techniques require a review of an MIB support-list (which is standard documentation), from the current agent's vendor in order to understand which MIBs are actually supported by the agent and available to the NMS. If the support-list is unknown, then the common way to date of determining different vendors available in the enterprise area is to perform the type of intensive MIB walk detailed above. This is a less than optimal approach for the reasons discussed above.

A related problem arises once the correct set of MIBs needed for management of an SNMP agent is determined (either through documentation or programmatically). Using conventional methods, the NMS needs to load the MIBs identified as necessary on the NMS in order to manage the SNMP agent. In many cases, it is necessary to locate these MIBs, as they are often proprietary and not readily available. It can take an extended period of time to locate and retrieve these MIBs, and then they must be compiled and/or loaded into the NMS.

BRIEF SUMMARY OF THE INVENTION

The illustrative embodiment of the present invention provides a generic mechanism enabling the programmatic identification of MIBs needed for control of an SNMP agent for a network device. The present invention further provides for the automatic retrieval of the identified MIBs and their loading onto a network management station (NMS) without user intervention. Additionally, previously known MIBs are programmatically examined to determine whether they require updating. Any required updates may be performed automatically with the updated MIBs being loaded onto the NMS.

In one embodiment, in a network, a method for acquiring and deploying needed Management Information Bases (MIBs) includes the step of determining automatically the identity of at least one MIB needed to manage a Simple Network Management Protocol (SNMP) agent associated with a network device. The method further includes the step of programmatically retrieving at least one identified MIB from a MIB repository. Following retrieval, the method loads the MIB onto a Network Management Station to enable the management of the network device associated with the SNMP agent.

In another embodiment, a system for acquiring and deploying needed Management Information Bases (MIBs) includes an SNMP agent associated with a device communicating over a network. The system also includes a network management station. The network management station includes a MIB discovery application for automatically determining the identity of at least one MIB needed for management of the SNMP agent associated with the network device. The MIB discovery application programmatically retrieves at least one identified MIB from a MIB repository and loads the MIB onto the network management station to enable the management of the SNMP agent. Additionally, the system also includes a MIB repository holding multiple MIBs.

In an embodiment in a network, a method for acquiring and deploying needed management information bases (MIBs) includes the step of determining automatically the identity of at least one MIB needed for management of an SNMP agent associated with a network device. The method further includes the step of querying a MIB repository so as to identify at least one MIB previously loaded on a network management station that requires updating. Also, the method updates at least one MIB previously loaded on the network management station for which it is determined that the MIB requires updating by loading a newer version of the previously loaded MIB.

In another embodiment in a network, a method for identifying, acquiring and deploying needed Management Information Bases (MIBs) includes the step of automatically determining the identity of a vendor of a network device. At least one
MIB needed for management of an SNMP agent associated with the network device is then identified. The method includes the additional step of programmatically retrieving the identified MIB or an update for the identified MIB that is needed for management of the SNMP agent from a MIB repository. Following retrieval of the MIB or the update for the MIB, the method loads the identified MIB or the update for the identified MIB needed for management of the SNMP agent onto a Network Management Station.

In one embodiment in a network, a method for identifying Management Information Base (MIB) vendors, includes the step of sending a first SNMP GetNext request to an SNMP agent for a network device, the GetNext request including a first Object ID. The method further includes the step of receiving a first response to the first SNMP GetNext request from the SNMP agent. The response identifies a first vendor of a MIB. The method additionally includes the sending of a second SNMP GetNext request to the SNMP agent for the network device. The second request includes an Object ID selected as being beyond the last implemented Object ID for the vendor previously identified. The method also includes the step of receiving a second response from the SNMP agent.

In an embodiment in a network, a method for identifying Management Information Base (MIB) vendors, includes the step of sending a first request to an agent for a network device, the first request including a first Object ID. The method further includes the step of receiving a first response to the first request from the agent. The response identifies a first vendor of a MIB. The method additionally includes the sending of a second request to the agent for the network device. The second request includes an Object ID selected as being beyond the last implemented Object ID for the vendor previously identified. The method also includes the step of receiving a second response from the agent that identifies a second vendor.

BRIEF DESCRIPTION OF THE DRAWINGS

These and other aspects of this invention will be readily apparent from the detailed description below and the appended drawings, which are meant to illustrate and not to limit the invention, and in which.

DETAILED DESCRIPTION OF THE INVENTION

The illustrative embodiment of the present invention addresses many of the problems associated with conventional methods of identifying, retrieving and loading Management Information Bases (MIBs) needed for a Network Management Station to communicate with a Simple Network Management Protocol (SNMP) agent for a network device. The MIBs are identified in a manner that does not require excessive network communication. The automation of the identification, retrieval and loading process removes a common source of user error and frustration for system administrators attempting remote configuration of network devices. The illustrative embodiment also automates the updating of previously known MIBs and uses either a specialized querying technique via SNMP or pre-defined vendor profiles to provide for a more exhaustive search of the MIB repository storing the MIBs. The present invention does not need to have prior knowledge of where MIB information is stored on a target SNMP agent or the different implementations of storage, retrieval, and assembly that may be required by different vendor's proprietary SNMP agent implementations.

Figure 1:
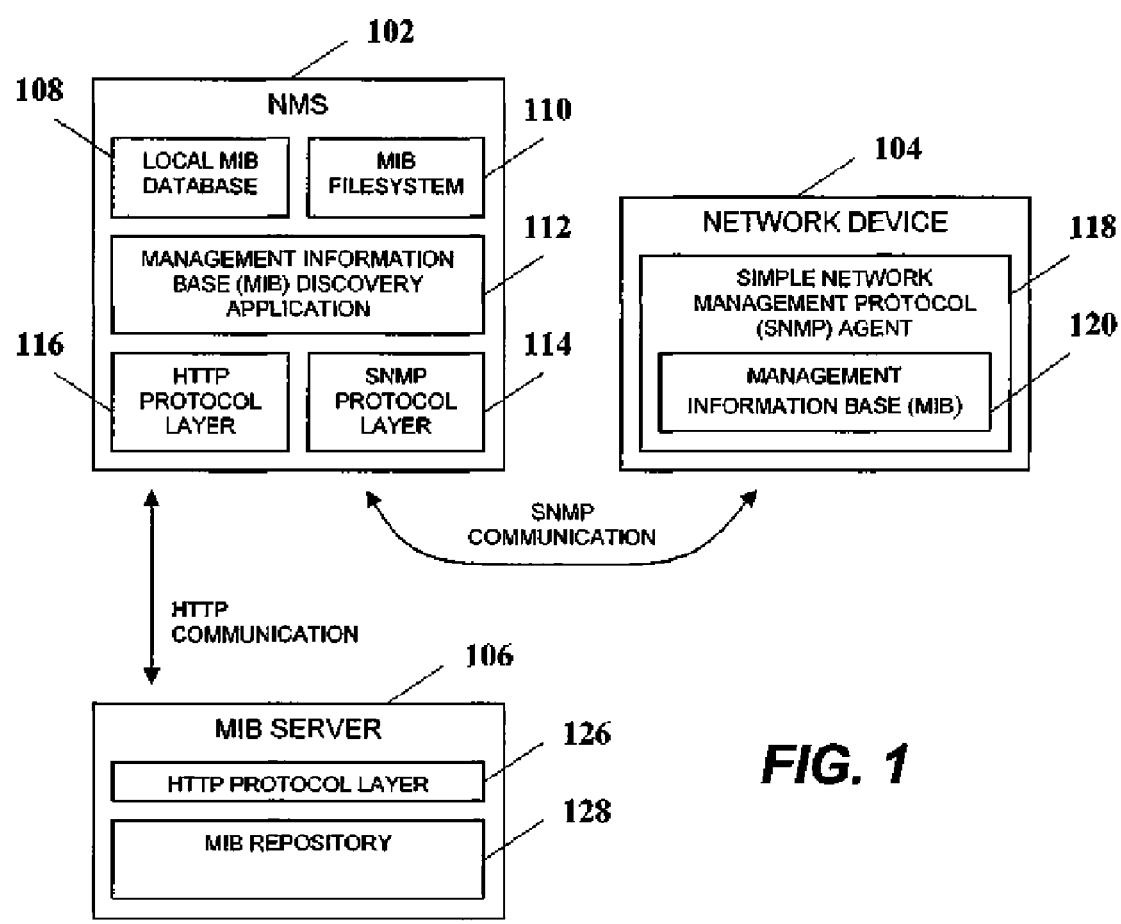
FIG. 1 is a block diagram of an environment suitable for practicing the illustrative embodiment of the present invention.

FIG. 1 depicts a block diagram of an environment suitable for practicing the illustrative embodiment of the present invention. A network 100 includes a Network Management Station (NMS) 102, an SNMP-managed network device 104 hosting a Simple Network Management Protocol (SNMP) agent 118, and a MIB Server 106. The NMS 102 includes a local MIB database 108, a MIB File-system 110, a MIB discovery application 112, an SNMP protocol layer 114, and an HTTP protocol layer 116. The NMS 102 may be a server, mainframe, desktop computer, laptop, workstation, or other electronic device interfaced with a network that is equipped with a processor and capable of supporting the NMS components discussed herein. The local MIB database 108 includes tables of compiled MIBS and MIB object data and is discussed further in relation to FIG. 2 below. The MIB file system 110 is a hierarchical data structure holding MIBs and pre-compiled MIBs as well as vendor profiles in pre-determined areas on the network management station 102. The MIB file system 110 is discussed further in relation to FIG. 3 below. The MIB discovery application 112 is used by the illustrative embodiment of the present invention to identify MIBs needed to communicate with the SNMP agent 118 for the network device 104, retrieve and/or update the MIBs and load the MIBs on the network management station 102. The MIB discovery application 112 uses the SNMP layer 114 to communicate with the SNMP agent 118 and the Hypertext Transport Protocol (HTTP) layer 116 to communicate with the MIB server 106. An exemplary sequence of steps performed by the MIB discovery application 112 is discussed and illustrated in relation to the flow chart of FIG. 6 below.

The SNMP-managed network device 104 includes a Simple Network Management Protocol (SNMP) Agent 118, that in turn includes a MIB 120 holding information relating to the network device. The device MIB 120 is discussed further in relation to FIG. 4 below. The MIB Server 106 includes an HTTP protocol layer 126 used to communicate with the MIB discovery application 112 on the NMS 102. The MIB server also includes a MIB repository 128, a storage location holding multiple MIBs that is discussed further below in relation to FIG. 5. Although the term "server" is used to refer to the MIB server 106, it will be understood by those skilled in the art that the storage location holding the MIBs may be located in a number of different locations and on different devices without departing from the scope of the present invention. For example, rather than the MIB server 106 being located remotely from the NMS 102 as depicted in FIG. 1, the storage location, whether implemented as a server or not, could be located on the same electronic device as the NMS.

Figure 2:
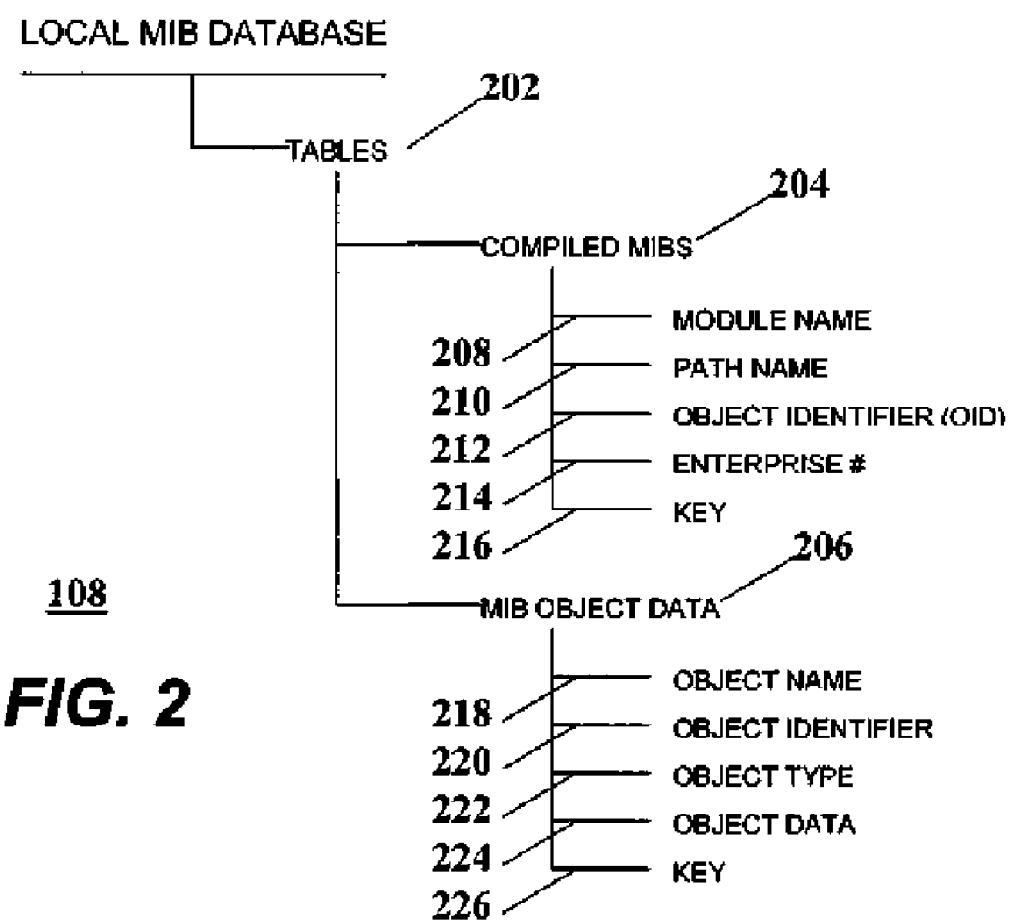
FIG. 2 is a diagram depicting a local MIB Database on the NMS.

The MIBs needed to communicate with the SNMP agent 118 are eventually loaded into the MIB file system 110 on the NMS and copies are stored in the local MIB database 108. As will be explained further below, the local MIB database 108 is checked by the MIB discovery application 112 to determine whether a full download or differential update needs to be performed. FIG. 2 is a diagram of the components of the local MIB database 108 on the NMS 102. It includes database tables 202. Two database tables 202 are depicted, the COMPILED MIBS table 204, and the MIB OBJECT DATA table 206. The COMPILED MIBS table 204 is used primarily by the NMS 102 to record important information about all known MIB modules. Some of that information is described in the fields MODULE NAME 208, PATH NAME 210, OBJECT IDENTIFIER (OID) 212, ENTERPRISE #214, and KEY 216. The field MODULE NAME 208 refers to the actual name of the MIB Module that is defined in the Abstract Syntax Notation 1 (ASN.1) MIB file. The field PATH NAME 210 refers to the physical location in the NMS MIB File-system 110 where the precompiled MIB module object data and/or raw ASN.1 text for the MIB module reside.

The field OID 212 refers to the first OID defined in that module that is globally unique. This OID 212 is used by the MIB discovery application 112 to determine the MIB capabilities of the SNMP-managed network device 104. A positive SNMP response from an SNMP agent 118 resulting from an SNMP GetNext request of OID 212 is a verification of the MIB capabilities of that MIB MODULE 208 on the network device 104 for the SNMP agent 118.

The field ENTERPRISE # represents a unique, private number that is assigned by the Internet Assigned Numbers Authority (IANA), to any private entity that applies for one. Vendors base their private MIBs off of their own, private enterprise number 214. The field KEY 216 is used as an identifier into the MIB OBJECT DATA table 206.

The NMS 102 loads MIB object data into this MIB OBJECT DATA table 206 either through manual compilation of MIBs or by the automatic loading of precompiled MIBs, either of which can be found in the MIB File-system 110, which is discussed further below. The fields of the MIB OBJECT DATA table 206 include the field OBJECT NAME 218, the field OBJECT IDENTIFIER 220, the field OBJECT TYPE 222, the field OBJECT DATA 224, and field KEY 226. The field OBJECT NAME 218 represents the MIB object name. The field OBJECT IDENTIFIER 220 represents the OID that corresponds to that specific OBJECT NAME 218. The field OBJECT TYPE 222 describes the type of MIB object. The field OBJECT DATA 224 contains all other MIB data properties (all defined within the ASN.1), corresponding to that MIB object, including MIB SYNTAX, ACCESS, DESCRIPTION, UNITS, etc. KEY 226 contains the value from KEY 216 from the COMPILED MIBS table 204, providing a reference from said table 204 to the correct MIB Module.

Although the local MIB database 108 and its compiled MIBs table 204 and MIB Object Data table 206 have been discussed as having the fields depicted in FIG. 2, those skilled in the art will recognize that the tables 202 in the local MIB database 108 may also be implemented with additional and/or substitute fields without departing from the scope of the present invention. Similarly additional tables may appear in the local MIB database 108 in addition to those discussed herein. Local MIB database 108, can include a true relational database, flat files, or simple structures in memory in use by a computer program. Fields can be included or excluded as long as identifying features of MIB files and related OIDs or any data that can be used to reconstruct those identifying features are included.

Figure 3:
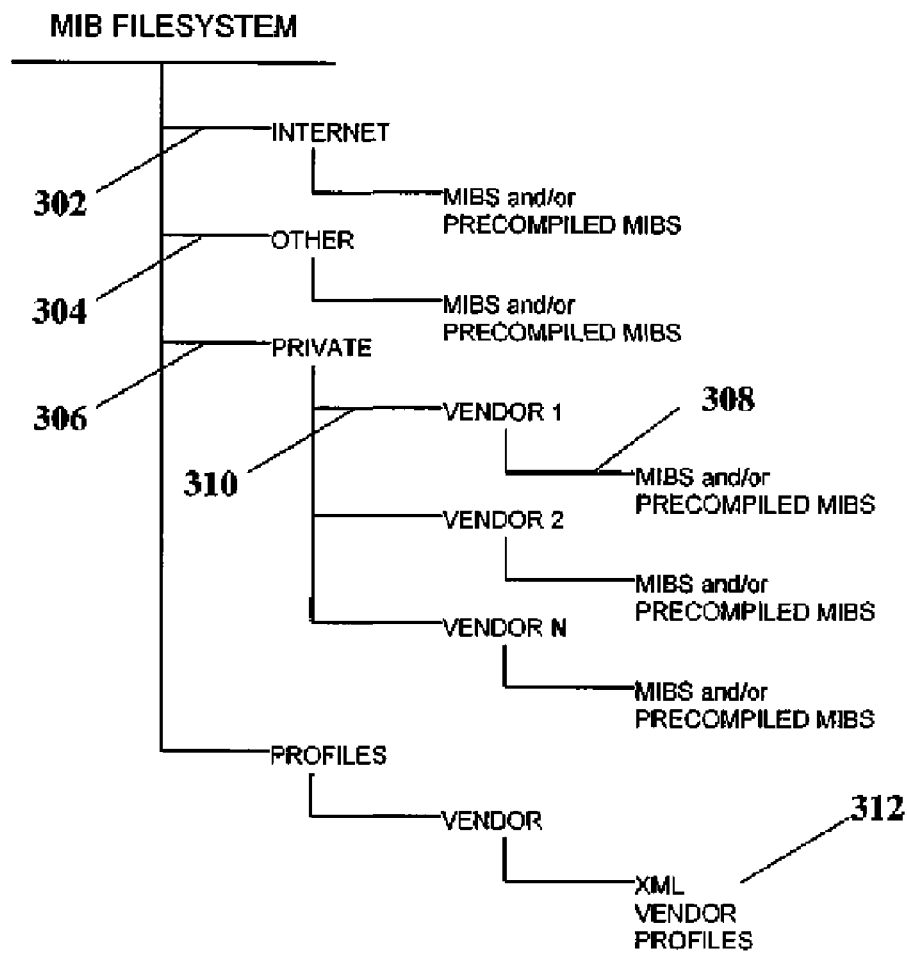
FIG. 3 is a diagram depicting a MIB File-system on the NMS.

FIG. 3 is a diagram of the MIB File-system 110 on the NMS 102. The MIB file system 110 is a hierarchical structure that groups MIBs and/or precompiled MIBs in predetermined areas. Three of those areas are defined as INTERNET 302, OTHER 304, and PRIVATE 306. INTERNET 302 contains MIBs and/or precompiled MIBs that are defined as industry standard and/or Internet Request for Comments (RFC). PRIVATE 306 contains all proprietary vendor MIBs; these are grouped by using separate directories by vendor 310 enterprise number. Each vendor directory 310 includes MIBs and/or precompiled MIBs 308. OTHER 304 contains MIBs and/or precompiled MIBs that do not fall into the aforementioned INTERNET or PRIVATE categories. MIBs are comprised of the raw ASN.1 text files, and precompiled MIBs are files that contain the compiled object data from the raw ASN.1 text files. It is from these MIBs and precompiled MIBs 308 that MIB object data is derived and loaded into the MIB OBJECT DATA table 206.

The MIB file system 110 also includes XML vendor profiles 312 that are used by the MIB discovery application 112 to determine which vendor enterprise numbers to consider when determining the needed MIBs for management of the network device 104. This is useful with respect to corporate mergers and acquisitions, and although the enterprise numbers may change, the underlying MIB capabilities often remain the same or new capabilities from the new vendor are just added to the existing capabilities. Thus, an SNMP agent 118 can be managed by utilizing MIB Modules by several different vendors (each vendor represented by their own, unique enterprise number). Those skilled in the art will recognize that vendor profiles 312 may be stored in any standard or proprietary format and is not limited to being stored in XML. Similarly, the MIB File-system 110 may do any of the following without departing from the scope of the present invention: the Internet 302, other 304, and private MIB 306 areas may be grouped together or located separately, the areas may be stored in any structure desired, and the Internet, other and private MIB areas may exist solely or coexist, as needed. MIB areas can have any name and/or description, and there can be as many or as few as is needed. Each area can contain any and all combinations of precompiled MIBs (in any format) and raw ASN.1 MIBs, compressed or uncompressed.

Another way of automatically determining the different vendors represented in an ENTERPRISE AREA, in-lieu of using a pre-defined vendor profile 312, is to implement a custom discovery technique by using a short series of SNMP GetNext requests to the agent. The SNMP GetNext requests are crafted in such a way as to minimize the actual number of request/response pairs being transferred between the NMS 102 and the SNMP agent 118 over the network. Since the SNMP standard defines the GetNext mechanism as one that must return the next OID in lexicographical order, the OID used in the GetNext request is modified in such a way as to force, if available, a return of the first OID in the SNMP MIB 120 of the next represented vendor in the ENTERPRISE AREA.

This automatic vendor detection technique provided by the illustrative embodiment of the present invention may be better understood by examining the situation where the ENTERPRISE AREA of a particular SNMP agent contains several PRIVATE MIBS from several different vendors. To initiate the conversation and determine the first vendor in the enterprise area, the MIB discovery application 112 sends a SNMP GetNext request to the SNMP agent 118 using the OID 1.3.6.1.4.1. The SNMP agent 118 returns the next OID in the enterprise area, representing the first vendor. The first vendor is determined by obtaining the enterprise number (e.g. the $7^{th}$ position of the following sysObjectID, 1.3.6.1.4.1.7013.1.1, contains the number 7013, which is the enterprise number for ByteSphere Technologies LLC). Once the first enterprise number is known, the first vendor is added to the list, and the MIB discovery application 112 can attempt at a next vendor in the enterprise area. The next OID to be constructed would be an OID that could represent the last possible OID in that vendor's MIB, being careful to choose one that is most probably not implemented on the SNMP agent 118 (e.g. 1.3.6.1.4.1.7013.999999). The MIB discovery application 112 sends an SNMP GetNext request to the SNMP agent 118 using the (probably) non-implemented OID and receives either a response that represents the next vendor represented in the ENTERPRISE AREA, or a response that will represent an OID outside of the ENTERPRISE AREA (e.g. 1.3.6.1.5.1.X). In the former case, the MIB discovery application 112 has detected another vendor, and it can continue to query the SNMP agent 118 in the same manner to determine the rest of the supported vendors. In the latter case, the MIB discovery application 112 has determined that there are no more vendors represented in the ENTERPRISE AREA (in the unlikely event that the chosen OID used in the GetNext request was in fact implemented by the previous vendor, the MIB discovery application can be configured to ignore the response). It is in this way that the MIB discovery application 112 can quickly and accurately determine all supported vendors by the SNMP agent 118. This method of querying the agent is better than the use of vendor profiles 312 in that it is always up to date whereas the vendor profiles 312 may not be completely up to date or may not be present for a particular vendor altogether. In the rare circumstance that a certain agent is not responding to SNMP GetNext requests or is responding incorrectly (not in lexicographical order), the vendor profiles 312 can be used as a backup.

Figure 4:
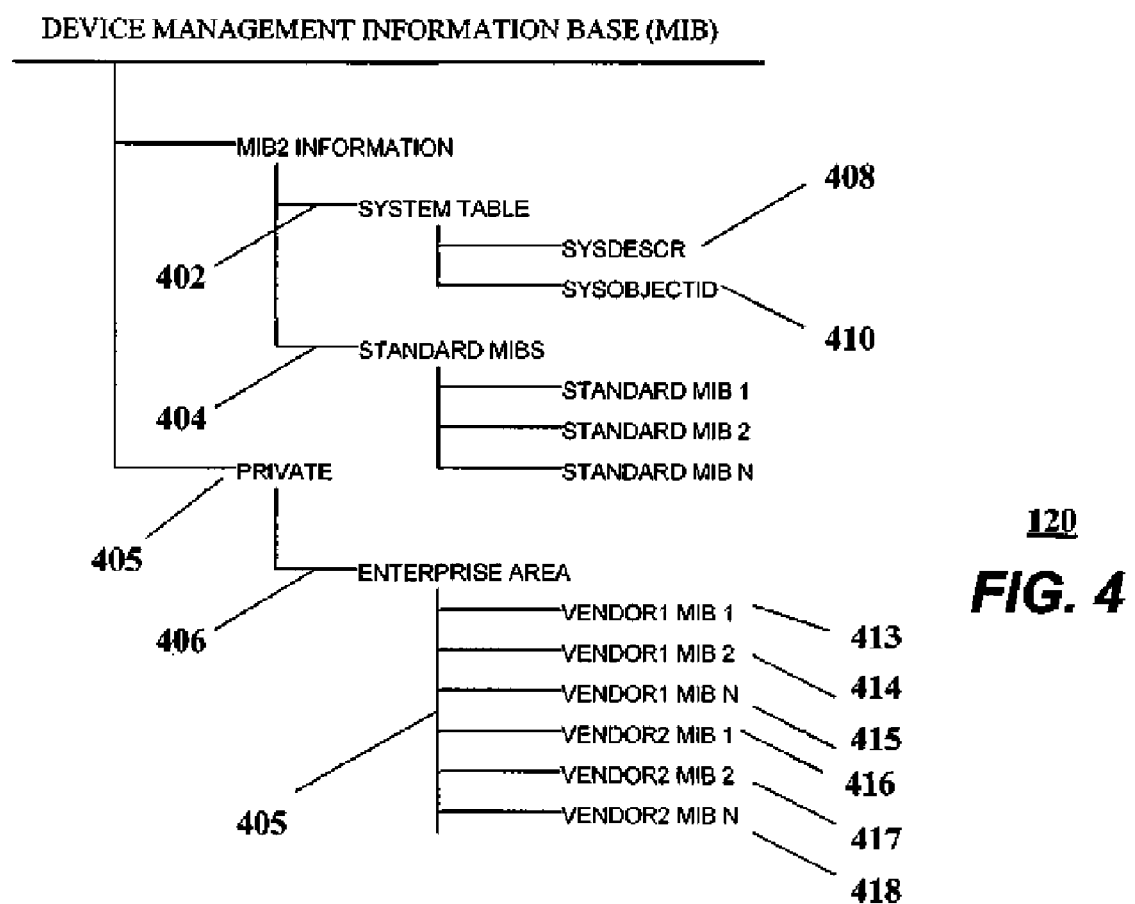
FIG. 4 is a diagram depicting an SNMP agent's MIB on the managed device.

The SNMP-managed network device 104 is managed by an associated SNMP agent 118. The SNMP agent includes a MIB 120 of its own which holds information about the network device. FIG. 4 is a diagram of the MIB 120 on the SNMP agent 118, holding information about the network-managed device 104. Among the information that is generally available from the SNMP MIB 120 is the SYSTEM TABLE 402, STANDARD MIBS 404, and PRIVATE MIBS 405 in an ENTERPRISE AREA 406. The MIB discovery application 112 queries the SYSTEM TABLE 402 for the information from the objects sysDescr 408 and sysObjectID 410. The object sysObjectID 410 can be parsed to determine the vendor of the SNMP agent 118 by obtaining the enterprise number (e.g. the $7^{th}$ position of the following sysObjectID, 1.3.6.1.4.1.7013.1.1, contains the number 7013, which is the enterprise number for ByteSphere Technologies LLC). Once the enterprise number is determined, the appropriate vendor can be determined by cross-referencing the enterprise number against a vendor list. The object sysDescr 408 provides descriptive information about the device, and it used in conjunction with the information in the sysObjectID 410 by the MIB discovery application 112 during the processing of the vendor profiles 312. The enterprise area 406 includes information about the different private vendor MIBs. Thus, enterprise area 406 may include vendor1 MIB 1 (413), vendor1 MIB 2 (414) vendor 1 MIB N (415), vendor2 MIB 1 (416), vendor2 MIB 2 (417) and vendor2 MIB N (418). The information from the sysDescr 408 and the sysObjectID 410 can accurately identify the device and any possible additional enterprise numbers that may need to be added to a list that is processed by the MIB discovery application 112.

Figure 5:
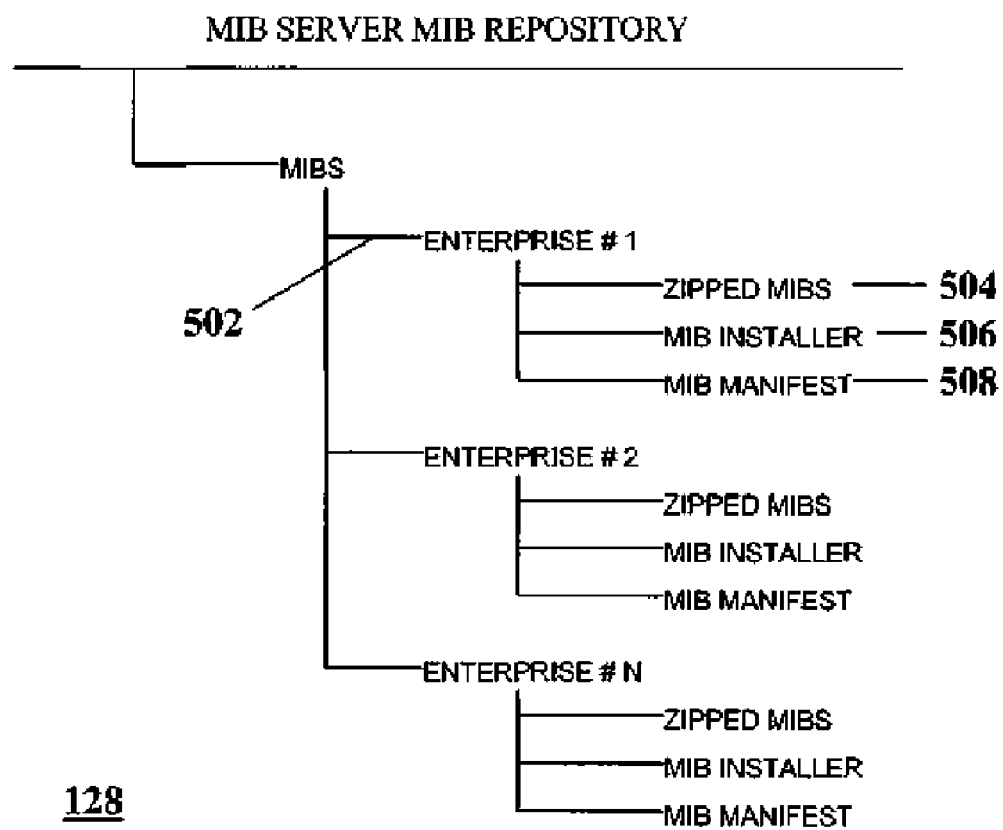
FIG. 5 is a diagram depicting the MIB Server's MIB Repository.

The MIB server is populated with available MIBs and is used by the MIB discovery application 112 to retrieve MIBs needed for communication with the SNMP agent 118. FIG. 5 depicts the MIB Repository 128 on the MIB Server 106. Similar to the NMS MIB File-system 110, the MIB Repository 128 is a File-system area on a server that contains available MIBs 504, both precompiled and raw ASN.1, in addition to a precompiled, self-installing compressed MIB Installer 506. The MIBs are organized by enterprise number 502. Located in each individual enterprise directory, are ZIPPED MIBS 504 (both precompiled and raw ASN.1 text), a MIB INSTALLER 506, and a MIB MANIFEST 508. The MIB Installer is a compressed, self installing application that contains all the MIBs available for the vendor in question, in a precompiled format. The MIB INSTALLER 506, after being downloaded and upon execution, installs all precompiled MIBs for the vendor automatically into the NMS MIB File-system 110 and informs the NMS 102 to update itself with the new MIBs. The NMS 102 then registers the new MIBs into the local MIB database 108 into table COMPILED MIBS 204 so as to give the NMS an accurate record of the new MIBs that are available The MIB MANIFEST 508 for each enterprise number 502 includes a list of all MIBs available for this vendor and the last update date of each MIB file. This allows the MIB discovery application 112 to know which MIBs are available for a certain vendor and also to determine during a differential update 620 which MIBs need to be downloaded from the MIB Server 106 and registered into the NMS local MIB database 108. The MIB Manifest 508 can be either maintained manually on the MIB Repository 128 or can be generated dynamically by querying the MIB Repository during run-time. The new MIBs may also be loaded into the local MIB database 103 into table MIB OBJECT DATA 206 at registration time as well.

It should be noted that the MIB installer 506 may also be implemented in a variety of ways without departing from the scope of the present invention. The MIB Installer 506 can be implemented in multiple formats, including multiple types of file arrangement and/or compression as long as the MIBs, or instructions on how to recreate MIB objects are included in the distribution. The MIB Installer may be self-installing or installed manually. The present invention may also be practiced without a MIB Installer being utilized in the update process.

Alternate implementations of the MIB Repository 128 are also possible within the scope of the present invention. For example, the MIB Repository 128 can contain raw uncompressed MIBS, compressed MIBs, and/or precompiled MIBs. The MIB Repository 128 does not have to keep a MIB Installer, comprising all precompiled MIBs, but rather can keep MIBs in any format, compiled or precompiled, compressed or uncompressed, standard or proprietary. The MIB Repository 128 can keep instructions on how to rebuild MIBs rather than holding the actual MIBs or precompiled MIBs. The MIB Repository can contain symlinks or hyperlinks to other servers (either local or remote) that point to other MIBs. As noted above, the MIB Repository 128 does not have to store a copy of MIB Manifest 508, but can generate one automatically when queried. The MIB Repository 128 does not have to support a MIB Manifest 508, may be located remotely or locally, and may be manually or automatically updated within the scope of the present invention.

Figure 6:
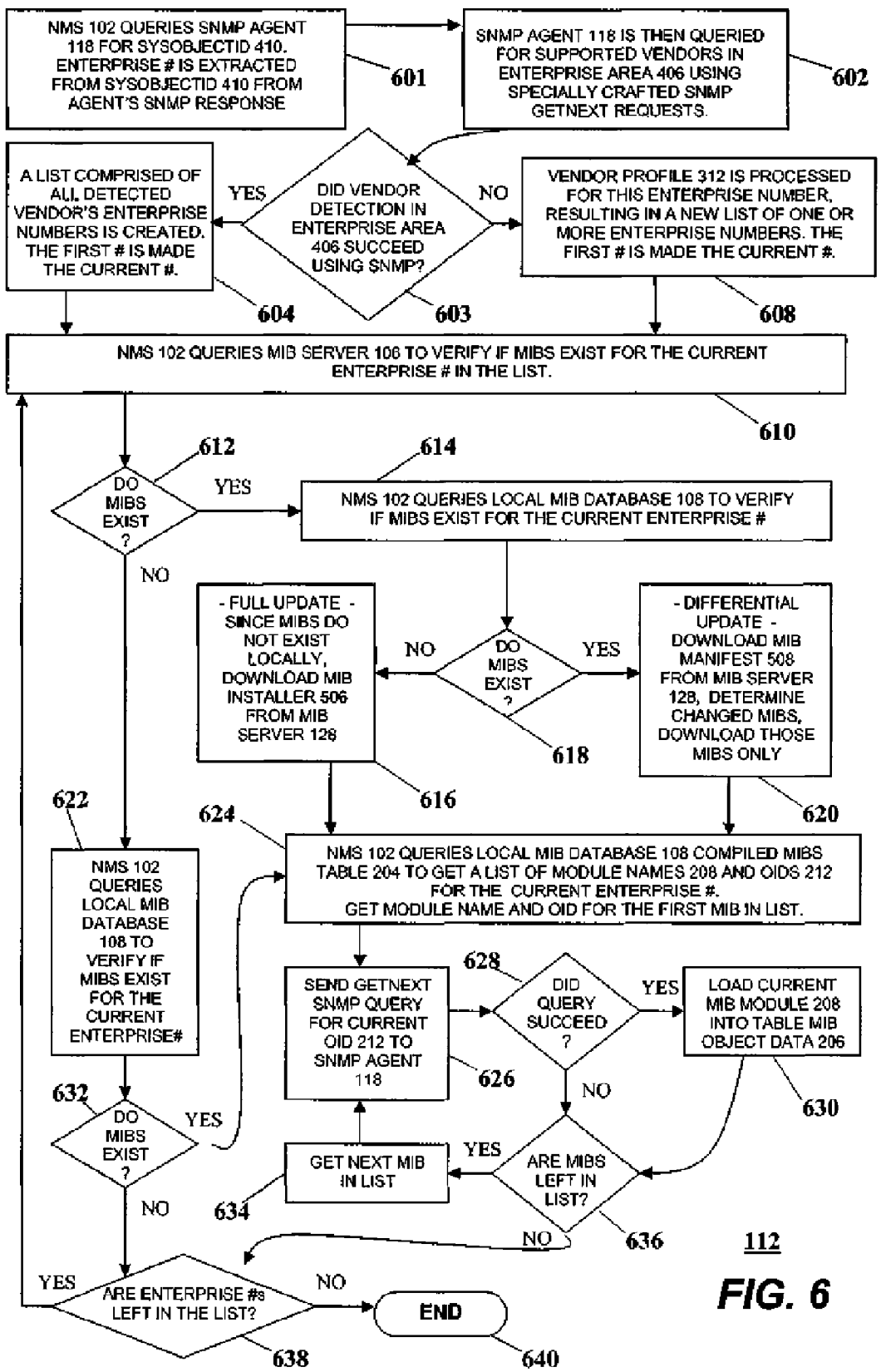
FIG. 6 is a flow-chart depicting the operation of the NMS, the managed device, and the MIB Server, in accordance with the present invention.

FIG. 6 is a flow-chart depicting the sequence of steps followed by the MIB discovery application 112 to identify, retrieve, and load the MIBs needed for communication with the SNMP agent 118. The sequence begins with the MIB discovery application 112 querying the SNMP Agent 118 for the sysObjectID 410 in the device MIB 120. The enterprise number is extracted from the sysObjectID 410 from the SNMP response from the SNMP Agent 118 (step 601). The SNMP agent 118 is then queried for any and all supported vendors in the ENTERPRISE AREA 406 (step 602) using the sequence of SNMP GetNext requests discussed above. If the vendor detection phase succeeds (step 603), a list is created of all detected enterprise numbers (step 604). If the vendor detection phase fails (step 603), the MIB File-system 110 is searched for a corresponding vendor profile 312 for this enterprise number. If a vendor profile 312 does not exist for this enterprise number, a list comprised of a single enterprise number is created. The retrieved enterprise number is made the current enterprise number. If a vendor profile 312 does exist for this enterprise number, the vendor profile 312 is processed for this enterprise number, resulting in a new list of one or more enterprise numbers. The first number in this list is made the current enterprise number (step 608).

The enterprise number processing stage occurs when the MIB discovery application 112 queries the MIB server 106 using HTTP communication to verify if MIBS exist for the current enterprise number in the list (step 610). Those skilled in the art will recognize that the query to the MIB server 106 may be sent using other communication protocols in addition to, or instead of, HTTP, such as FTP or a combination of protocols, without departing from the scope of the present invention. If the MIB discovery application 112 determines that MIBs do not exist on the MIB server (step 612), the MIB discovery application 112 queries the local MIB database 108 to verify if MIBs exist locally on the NMS 102 for the current enterprise number (step 622). If the MIB discovery application 112 determines that MIBs do exist locally on the NMS (step 632), then the next stage that is executed is the Agent Discovery Phase discussed further below. If the MIB discovery application 112 determines that MIBs do not exist locally on the NMS 102 for the current enterprise number, the MIB discovery application checks to see if there are any enterprise numbers left in the master list (step 638). If there are not any enterprise numbers left in the master list, the MIB discovery application 112 ends (step 640). If there are enterprise numbers left in the master list, the next enterprise number in the list is made the current number, and the process iterates to determine if MIBs exist on the MIB server 106 for the new enterprise number (step 610). If the MIB discovery application 112 determines that MIBs do exist on the MIB Server 106 for a current enterprise number (step 612), the MIB update phase is launched.

The MIB update phase occurs after the determination is reached by the MIB discovery application 112 that the needed MIBs exist on the MIB server 106 (step 612). The MIB discovery application 112 queries the local MIB database 108 to determine if the needed MIBs exist locally on the NMS 102 for the current enterprise number (step 614). If the MIB discovery application determines that the needed MIBs do not exist locally on the NMS 102 (step 616), a full update retrieving the MIBs from the MIB server is performed (step 618). A full update includes the download of the MIB Installer application 506 from the MIB Server 106 and the execution of the MIB Installer 506. The MIB installer application 506 installs all of the precompiled MIBs for the vendor automatically into the NMS MIB File-system 110 and informs the NMS 102 to update itself with the new MIBs. The NMS 102 then registers the new MIBs into the local MIB database 108. If the MIB discovery application 112 determines that MIBs do exist in the local MIB database 108, a differential update of the MIBs is performed (step 620). During a differential update 620, a MIB manifest 508 is downloaded for the current enterprise number. The MIB manifest 508 includes a list of all MIBs available for the current enterprise number and the last update date of each MIB file. This allows the MIB discovery application 112 to determine during the differential update which MIBs are newer or not present on the NMS 102. The identified MIBs are downloaded from the from the MIB repository 128 on the MIB Server 106 and loaded into the NMS local MIB database 108. After the full update (step 616) or differential update (step 620) occurs, the next stage that is executed is the Agent Discovery Phase.

The Agent Discovery Phase starts with the NMS 102 querying the local MIB database 108 COMPILED MIBS table 204 to get a list of MODULE NAMES 208 and OIDs 212 for the current enterprise number (step 624). The MODULE NAME and OID for the first MIB in the list is retrieved. The NMS 102 then sends a SNMP GETNEXT query for the current OID 212 to the SNMP Agent 118 (step 626). If the query is determined to have succeeded (step 628), the current MIB MODULE 208 is loaded into the database table MIB OBJECT DATA 206 (step 630). If the NMS 102 determines that there are more MIBs in the list created during the discovery phase (step 634), then the next MIB in the list is processed (step 636), and the SNMP query process is repeated (step 626). If an SNMP query fails (step 628), no MIB is loaded, and the list simply continues to be processed. Once there are no MIBs left in the list (step 634), the MIB discovery application 112 checks to see if there are enterprise numbers left in the list (step 638). If there are enterprise numbers left in the list, the enterprise number processing stage is executed again on the next enterprise number in the list. If there are not enterprise numbers left in the list, the program ends 640.

Those skilled in the art will recognize that the sequence of steps followed by the MIB discovery application 112 and the NMS 102 described herein may be altered without departing from the scope of the present invention. Similarly the components utilized to dynamically identify, retrieve and load MIBs needed for communication with an SNMP agent for a network device may also vary from those described above. For example, vendor profiles do not have to be included and/or processed and when used are not required to perform checks on the sysDescr. Similarly, the MIB discovery application need not create a list of enterprise numbers but instead may process a single enterprise number in isolation.

In alternate implementations of the present invention, during the initial query from the MIB discovery application 112 to the SNMP agent 118, the MIB discovery application 112 is not limited to querying for only sysObjectID 410 and sysDescr 408. The MIB discovery application 112 can limit the query to only sysObjectID 410 or can query alternate MIB Objects, including but not limited to objects in the mib2.sysORTable. Specifically querying the sysORTable if present and extracting MODULE NAMES and enterprise numbers from the SNMP responses can serve as an alternative or an additional step to the Agent Discovery Phase 624.

Likewise, substitute methods of determining which enterprise number belongs to an agent can be used, as long as the methods result from queries that were performed against the SNMP agent 118. Alternate methods of storing the enterprise number(s) to process can be used, including but not restricted to integers, longs, doubles, floats, lists, arrays, matrices, collections, vectors, flat files, database tables and/or records.

The entire MIB 120 can be walked on the SNMP Agent 118 to determine the loaded MIBs by cross-referencing SNMP responses with MIBs loaded in the Local MIB Database 108.

Similarly, rather than query a Vendor Profile 312, the entire MIB 120 can be walked on the SNMP Agent 118 to determine the list of vendors supported by SNMP Agent 118. Or, a subset of SNMP queries targeting the enterprise area for each vendor of interest could be executed. Once the list of supported vendors is determined, the MIBS can be acquired for each vendor/enterprise number if not already found locally in the Local MIB Database 108 on the NMS 102. In one implementation, to get a more refined set of OIDs and MODULES that are supported by SNMP Agent 118, the NMS 102 may query those OIDS defined in modules with AGENT-CAPA-BILITIES macros (these can define the capabilities provided by a particular implementation of SNMP Agent 118).

In an alternate implementation the MIB discovery application does not need to download the MIB Installer for a full update, but can download all relevant MIBs individually and either compile (if in ASN.1 format), load (if precompiled or in some standard or non-standard proprietary format), or reconstruct (if objects must be reassembled from a set of instructions), each one individually. The MIB discovery application can download all relevant MIBs in a compressed or uncompressed distribution (file), extract them from the distribution and them either compile or load each one individually.

Those skilled in the art will recognize that the order in which the MIB discovery application queries for MIBs can be changed from the sequence outlined above without departing from the scope of the present invention. For example, the local MIB database can be queried before the MIB Server, both the local MIB database and the MIB server can be queried at the same time, or one can be queried without the other. Similarly the local MIB database can be queried each time and the MIB server can be queried periodically according to some predetermined period to determine whether updates exist.

In one embodiment, the MIB discovery application 112 does not need to download a MIB Manifest 508 and individual MIBs or individual compiled MIBs to perform a differential update.

In an embodiment, a differential MIB update for an enterprise vendor X can include the MIB discovery application 112 checking the date on the full MIB distribution file (either precompiled, raw, or instruction based), and if the date is newer on the file residing on the MIB Repository 128 than the last update time on the NMS 102 for vendor X, then the MIB discovery application 112 can download the full distribution, extract the MIBs (either precompiled, raw, or instruction based), and do the comparison locally at the NMS 102 to determine which MIBs need to be updated in the Local MIB Database 108.

In other embodiments, a differential MIB update can also be referred to and performed as an incremental update, and vice versa. The differential update may include an alternate set or order of instructions as long as the NMS 102 and MIB discovery application maintains the basic idea of determining which MIBS need to be updated and acquires and updates those MIBs in the NMS 102 (either locally or remotely).

In additional implementations, the MIB server does not have to include a differential update or MIB manifest. The download from the MIB server does not have to include a full update but rather may perform a partial update. The download from the MIB server can include but is not restricted to: ASN.1 MIBs (individually packaged or packaged together), a MIB Installer or some type of compressed or bundled set of MIBs, PRECOMPILED MIBs (in any format, either standard or proprietary), and MIBs in XML or other formats.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

What is claimed as new and desired to be protected by Letters Patent of the United States is:

1. In a network, a method for identifying Management Information Base (MIB) vendors, comprising: sending from a computing device a first Simple Network Management Protocol (SNMP) GetNext request to an SNMP agent for a network device, the first SNMP GetNext request including a first object ID; receiving with the computing device a first response to the first SNMP GetNext request from the SNMP agent, the response identifying a first vendor of a MIB; adding the first vendor to a MIB vendor list; dynamically determining based on the first response received from the SNMP agent an object ID determined to be numerically greater than the last implemented Object ID for the vendor previously identified in the first response; sending from the computing device a second SNMP GetNext request to the SNMP agent for the network device after the receipt of the first response, the second SNMP GetNext request including the Object ID dynamically determined to be numerically greater than the last implemented Object ID for the vendor previously identified in the first response; receiving with the computing device a second response from the SNMP agent following the sending of the second request; identifying the presence of a second vendor based on the second response; and adding the second vendor to the MIB vendor list; using the identified vendors to identify at least one MIB needed for management of an SNMP agent associated with the network device; retrieving programmatically one of the identified at least one MIB or an update for the identified at least one MIB needed for management of the SNMP agent from a MIB repository;

loading said one of the identified at least one MIB or an update for the identified at least one MIB needed for management of said SNMP agent onto a Network Management Station, wherein the MIB being loaded is a non-compiled MIB or the update being loaded is for a non-compiled MIB.

2. The method of claim 1 wherein the MIB being loaded is a pre compiled MIB.

3. The method of claim 1 wherein a value returned in the second response indicates that there are no more MIBs controlled by the SNMP agent.

4. The method of claim 1, wherein the Object ID in the second SNMP GetNext request is the last numerically possible Object ID for the vendor identified in the first response.

5. A non-transitory computer-readable medium holding computer-executable instructions for identifying Management Information Base (MIB) vendors, the instructions when executed causing a computing device to: send a first SNMP GetNext request to an SNMP agent for a network device, the GetNext request including a first object ID; receive a first response to the first SNMP GetNext request from the SNMP agent, the response identifying a first vendor of a MIB; add the first vendor to a MIB vendor list; dynamically determine based on the first response received from the SNMP agent an object ID determined to be numerically greater than the last implemented Object ID for the vendor previously identified in the first response; send a second SNMP GetNext request to the SNMP agent for the network device after the receipt of the first response, the second request including the Object ID dynamically determined to be numerically greater than the last implemented Object ID for the vendor previously identified in the first response; receive a second response from the SNMP agent following the sending of the second request; identify the presence of a second vendor based on the second response; and add the second vendor to a MIB vendor list; use the identified vendors to identify at least one MIB needed for management of an SNMP agent associated with the network device; retrieve programmatically one of the identified at least one MIB or an update for the identified at least one MIB needed for management of the SNMP agent from a MIB repository; load said one of the identified at least one MIB or an update for the identified at least one MIB needed for management of said SNMP agent onto a Network Management Station, wherein the MIB being loaded is a non-compiled MIB or the update being loaded is for a non-compiled MIB.

6. The non-transitory computer-readable medium of claim 5, wherein the instructions further include the step of: adding the identified vendors to a list.

7. The non-transitory computer-readable medium of claim 6, wherein the execution of the instructions further cause the computing device to: using the identified vendors to identify at least one MIB needed for management of an SNMP agent associated with the network device.

8. The non-transitory computer-readable medium of claim 7, wherein the instructions when executed further cause the computing device to: retrieve programmatically one of the identified at least one MIB and an update for the identified at least one MIB needed for management of the SNMP agent from a MIB repository.

9. The non-transitory computer-readable medium of claim 8, wherein the instructions when executed further cause the computing device to: load said one of the identified at least one MIB and an update for the identified at least one MIB needed for management of said SNMP agent onto a Network Management Station.

10. The non-transitory computer-readable medium of claim 9 wherein the MIB being loaded is a pre-compiled MIB.

11. The non-transitory computer-readable medium of claim 5 wherein a value returned in the second response indicates that there are no more MIBs controlled by the SNMP agent.

12. The non-transitory computer-readable medium of claim 5, wherein the Object ID in the second SNMP GetNext request is the last numerically possible Object ID for the vendor identified in the first response.

13. In a network, a method for identifying Management Information Base (MIB) vendors, comprising: sending a first request from a computing device to an agent for a network device, the first request including a first object ID; receiving a first response with the computing device to the first request from the agent, the response identifying a first vendor of a MIB; adding the first vendor to a MIB vendor list; dynamically determining based on the first response received from the agent an object ID determined to be numerically greater than the last implemented Object ID for the vendor previously identified in the first response; sending a second request from the computing device to the agent for the network device after the receipt of the first response, the second request including the Object ID dynamically determined to be numerically greater than the last implemented Object ID for the vendor previously identified in the first response; receiving with the computing device a second response from the agent that identifies a second vendor of a MIB following the sending of the second request; identifying the presence of a second vendor based on the second response; and adding the second vendor to the MIB vendor list; using the identified vendors to identify at least one MIB needed for management of an agent associated with the network device; retrieving programmatically one of the identified at least one MIB or an update for the identified at least one MIB needed for management of the agent from a MIB repository; loading said one of the identified at least one MIB or an update for the identified at least one MIB needed for management of said agent onto a Network Management Station, wherein the MIB being loaded is a non-compiled MIB or the update being loaded is for a non-compiled MIB.

* * * * *